Figure 4:
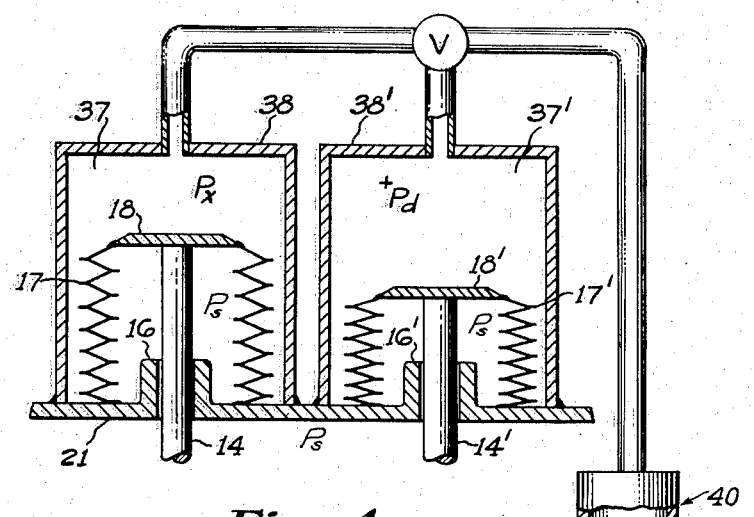

March 3, 1959  M. F. PETERS  2,875,621
MOTION TRANSMISSION IN SEALED FLUID SYSTEMS
Filed May 27, 1955  2 Sheets-Sheet 1
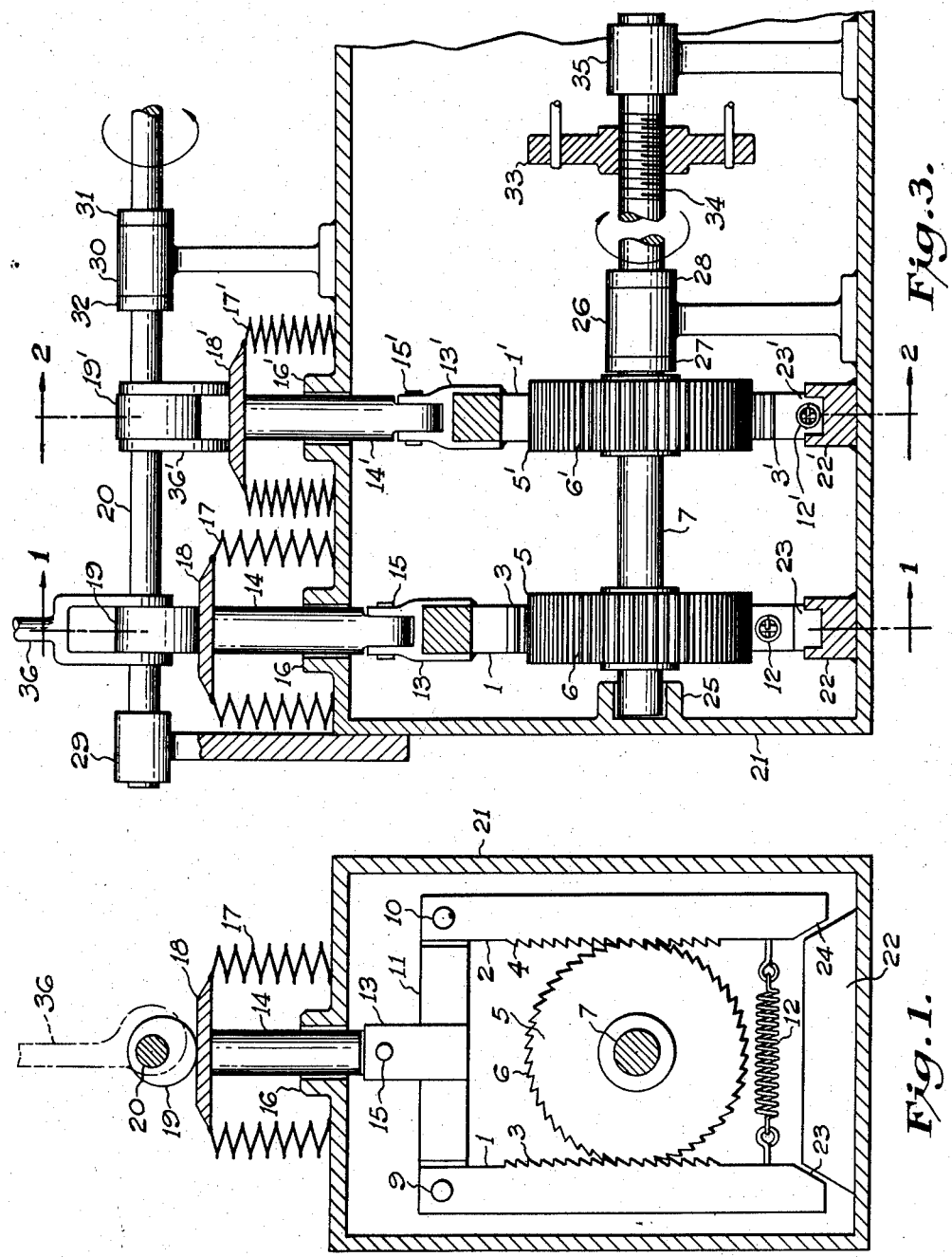
INVENTOR.
Melville F. Peters
BY
Martin J. Finnegan
ATTORNEY INVENTOR.
Melville F. Peters
BY Martin J. Finnegan
ATTORNEY

United States Patent Office 2,875,621
Patented Mar. 3, 1959

2,875,621

MOTION TRANSMISSION IN SEALED FLUID SYSTEMS

Melville F. Peters, Livingston, N. J.

Application May 27, 1955, Serial No. 511,507

4 Claims. (Cl. 74—18.2)

This invention relates to combining fluid seals or bellows with a mechanical assembly and in particular with the transmission of power into a hermetically sealed chamber by imparting a reciprocating motion to one or more bellows and converting this motion through a mechanical assembly into a rotary motion or a linear displacement.

The most general way of opening and closing a fluid valve is to rotate a threaded spindle in a bonnet or a threaded female section of the valve assembly, so that a disk or plate can be positioned or removed from a mating surface. Regardless of the construction the flow of fluid through the valve can always be controlled by subjecting the spindle to a rotation, or a translation, or to both a rotation and translation.

Recently power stations and chemical plants have been put into operation which require the control of fluids operating at high pressures and moving at high velocities. These fluids are controlled by valves and since many of the fluids are poisonous or radioactive, the valves are prevented from leaking by replacing the stuffing glands with bellows. When the operating pressures are low, the elongation unit length of bellows is relatively great. As the pressures are increased the length of the bellows must be increased to keep the ratio between plate deflection and plate stress constant. This change in bellows length with pressure increases very rapidly and as shown in the patent application of Melville F. Peters, Serial No. 416,463, the applicant in this application, a bellows having a free length of 8.75 inches and a 3 inch stroke, would have to be increased to 12.1 feet to permit the same stroke with the same plate stress when the pressure is increased from 100 p. s. i. to 2500 p. s. i.

As the output of these stations and plants is increased the size of the valve must be increased and this in turn will require an increase in the stroke of the bellows. Unfortunately, the room allowed for these valves does not increase in direct proportion to the size of the power plant and in general, the space reserved for a high pressure valve is not much greater than it is for a low pressure valve. At the present time, the bellows is the only flexible fluid seal which can be operated at high temperatures and when properly designed can be stroked through a small percentage of its length at high pressures without failing before completing a known life cycle. Since it is possible to convert relatively small reciprocating displacements into rotary motions which are continuous in direction, or to linear displacements which are continuous in direction, or to a combination of these motions which are continuous in the direction in which the motions are initiated, it is possible to use a bellows to hermetically seal a chamber and to transmit power through the seal by placing the bellows in the part of a mechanical assembly which has its movements confined to a reciprocating motion. It is therefore the first object of the invention to use a mechanical assembly in combination with a bellows which is used to hermetically seal a valve chamber and to arrange the mechanical assembly so that it will move the disk, or plate, or other sealing cover a distance which is proportional to the number of reciprocating cycles executed by the bellows. It is a second object of the invention to use a mechanical assembly to transmit a reciprocating motion to one or more bellows which are used as hermetical seals in a valve chamber and by the use of a second mechanical assembly to convert the reciprocating motion transmitted through the seals into a rotary motion, or a linear displacement, or to a combination of these two motions. It is a third object of the invention to use a plurality of cams on a rotating shaft to impart a reciprocating motion to a plurality of bellows which are used to hermetically seal a chamber and by the use of a second mechanical assembly to convert the reciprocating motion transmitted through the seals into a rotary motion, or a linear displacement, or to a combination of these two motions.

When a rotating cam acts upon a bellows it produces two forces, one force acting along the axis of the bellows and the other force acting normal to the axis. The force acting normal to the axis will produce a shear and cause the bellows to fail. This shearing force can be eliminated from the bellows by providing guides for the bellows. It is therefore a fourth object of the invention to eliminate the shearing forces on a bellows which is used to hermetically seal one part of a mechanical assembly from another part of the assembly by providing guides for the bellows which allows the bellows to execute a reciprocating motion and the guides to absorb the shearing stress.

In many units of an atomic power plant the fluid circulating in portions of the system are so corrosive, that all moving parts such as the mechanical assembly must be hermetically sealed from the fluids. When the fluids are operating at a high temperature the flexible seals are limited to bellows and to conserve space the bellows should operate at low pressures, so that advantage may be taken of the relatively large ratio which is allowed between the elongation and the free length of a low pressure bellows. If the low pressure bellows is to be used as a seal for the mechanical assembly in the high pressure systems, it is necessary to pressurize the valve chamber and to synchronize this applied pressure with the pressure in the system, so that the pressure differential between the chamber and the system can be maintained within the safe working pressure of the bellows. Methods of maintaining a low pressure differential across the bellows used for sealing the mechanical assembly from the system are fully described in the patent application of Melville F. Peters, Serial No. 475,475, filed December 15, 1954, the applicant in this application, and the described methods are applicable to this construction. It is therefore a fifth object of the invention to hermetically seal the mechanical assembly from the fluids in the system and to synchronize the pressure in the sealed valve chamber with the pressure in the system, so that the pressure differential between the chamber and the system does not exceed the safe working pressure of the sealing bellows.

A ratchet is a device which can be used to convert relatively small reciprocating motions into continuous rotary motions and these rotary motions can be converted into linear motions which are continuous in direction. It is therefore a sixth object of the invention to use a mechanical assembly to transmit a reciprocating motion to one or more bellows which are used as hermetical seals in a valve and by the use of a ratchet assembly to convert the reciprocating motion transmitted through the seals into a rotary motion, or a linear displacement, or to a combination of these two motions. It is a seventh object of the invention to use one or more cams on a crank shaft to produce a reciprocating motion in a plurality of bellows which are serving as fluid seals in a system and by the use of one or more ratchets convert the reciprocating motion of the bellows into a rotary motion of a second crankshaft for the purpose of doing work.

The direction of rotation of the shaft supporting the ratchet wheel is independent of the phase angle of the reciprocating motion and depends only upon the cut of the teeth of the ratchet assembly. When the shaft in sealed chamber must rotate in both a clockwise and counter-clockwise direction, it is necessary to use one ratchet or group of ratchets operating in parallel in the assembly with teeth cut to produce a clockwise rotation of the shaft and a second ratchet or group of ratchets operating in parallel in the assembly with teeth cut to produce a counter clockwise rotation of the shaft. To permit the ratchets to operate independently of each other and allow one group of ratchets to rotate the shaft clockwise without interference from the second group of ratchets, or to allow the second group of ratchets to rotate the shaft counterclockwise without interference from the first group of ratchets, it is necessary to provide a unit which can engage or disengage one ratchet or group of ratchet assemblies without interfering with the engagement or disengagement of the second ratchet or second group of ratchet assemblies. It is therefore an eighth object of the invention to use two or more ratchets, or two or more groups of ratchet assemblies to rotate a shaft, one ratchet or group of ratchet assemblies provided with teeth to rotate the shaft clockwise and the second ratchet or group of ratchet assemblies provided with teeth to rotate the shaft in a counter clockwise direction and each of the ratchet or ratchet assemblies provided with a unit which can engage or disengage the teeth of each ratchet or group of ratchet assemblies independently of the other ratchet or group of ratchet assemblies, so that the shaft can be rotated in a clockwise direction by the first assembly without interference by the second assembly, or the shaft can be rotated in a counter clockwise direction by the second assembly without interference by the first assembly. It is therefore a ninth object of the invention to provide the cam shaft with an eccentric device which can be used to lower the bellows assembly or assemblies to disengage the ratchet teeth on the arm from the ratchet teeth on the wheel, or to raise the eccentric device and engage the teeth on the arms with the teeth on the wheel.

A bellows will experience a reciprocating motion when a pulsating pressure applied to one side of a bellows oscillates about the pressure acting on the other side of the bellows. Since the reciprocating motion of the bellows is independent of the absolute pressure in the system and depends only upon the pressure differential across the bellows, it is possible to establish this reciprocating motion in a low pressure bellows operating in a high pressure system. This reciprocating motion of the bellows can then be converted in the valve chamber to a rotary motion or a linear displacement, so that it is possible to use low pressure bellows throughout the high pressure valve. It is a tenth object of the invention to impart a reciprocating motion to a bellows which is used as a fluid seal by subjecting the bellows to a pulsating fluid pressure. It is an eleventh object of the invention to convert the reciprocating motion of the bellows into a rotary motion, or a linear displacement, or a combination of the rotary motion and the linear displacement, where the rotary motion and linear displacement will be proportional to the amplitude of the pulsations, or to the number of pulsating cycles, or to both the amplitude and the number of pulsating cycles. It is a twelfth object of the invention to apply a pulsating pressure to one or more bellows assemblies, so that each bellows in the assembly executes a reciprocating motion and to use ratchets mounted on one or more shafts to convert the reciprocating motion of the bellows into a rotary motion of the shaft or shafts and by using one group of ratchets with teeth cut to produce a clockwise rotation of the shaft and a second group of ratchets with teeth cut to produce a counter clockwise rotation of the shaft and with units in the sealed chamber to engage or disengage the teeth in the ratchets when the pressure acting on the bellows is great enough to compress the bellows assembly a predetermined amount. The pulsating pressure can be applied to the bellows by a reciprocating pump or by a reciprocating pump with an air chamber between the piston and pump so that the minimum pressure applied to the bellows will not drop below the pressure in the chamber. The reciprocating pump can be of the piston type or when leakage of fluid around the piston cannot be tolerated a bellows may be substituted for the piston. Other types of impulse pumps will be satisfactory, although this invention is not concerned with the manner of generating the pulsating pressure.

The invention is not limited to a particular type of ratchet assembly or to a particular method of engaging or disengaging the teeth in the assembly, since any type of ratchet which depends upon a reciprocating motion can be substituted for the ratchet assembly shown in the drawings and the engagement or disengagement of the teeth in the assemblies can be made by using a separate bellows unit.

In the drawings:

Figure 1 is a cross sectional view of a power shaft and cam which forces a bellows used to seal a chamber to execute a reciprocating motion when the cam lock is in the raised position and through a mechanical assembly consisting of a rod, a swivel joint, a walking beam with two pins to support two ratchet arms and a ratchet wheel mounted on an output shaft, convert the reciprocating motion of the bellows into a continuous clockwise rotation of the output shaft, an embodiment of the invention.

Figure 2:
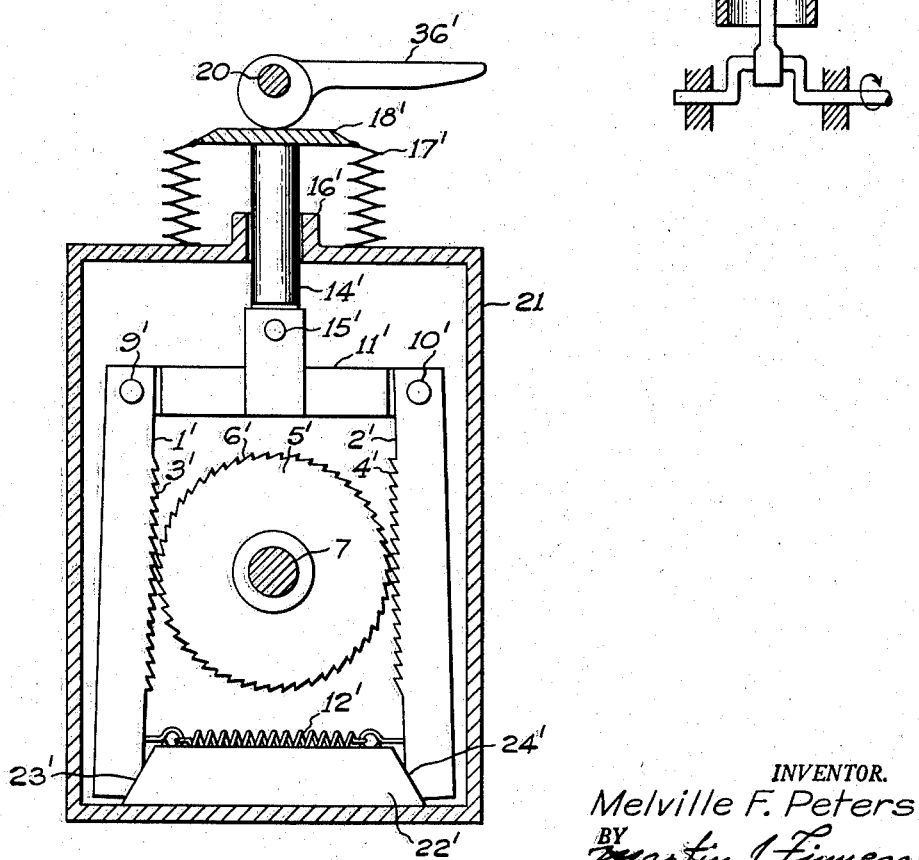

Figure 2 is a cross sectional view of an assembly which is the same as the assembly in Figure 1, except the teeth are cut so that when the power shaft and cam forces the bellows to execute a reciprocating motion, the mechanical assembly will force the output shaft to rotate counter clockwise, an embodiment of the invention.

Figure 3 is a cross sectional view of the two mechanical assemblies shown in Figures 1 and 2 respectively actuated by the same power shaft and transmitting their motions to the same output shaft, so that when the cam lock is raised in the first assembly and lowered in the second assembly, the output shaft will be rotated in a clockwise direction with a rotation of the power shaft and when the cam lock on the first assembly is lowered and the cam lock on the second assembly is raised, the output shaft will be rotated in a clockwise direction with a rotation of the power shaft, an embodiment of the invention.

Figure 4 is a cross sectional view of a pneumatic or hydraulic system which can produce a reciprocating motion in bellows used to seal a chamber and consists of a fluid tight cover for each bellows with an attachment for allowing fluid to enter or leave the chamber formed by the bellows and cover, rods attached to the capped ends of the bellows to actuate the mechanical assemblies, and guides for the rods, an embodiment of the invention.

In Figure 1 the two arms 1 and 2 are supplied with ratchet teeth 3 and 4 respectively to engage the mating teeth 6 on wheel 5 to form a ratchet which will cause both the wheel 5 and the output shaft 7 to rotate when the arms are forced by the walking beam 11 to execute a reciprocating motion. When the lock cam 36 is in the raised position, the movement of the two arms is obtained by rotating the power shaft 20, which rotates cam 19, which in turn forces plate 18, rod 14, swivel joint 13, beam 11 and arms 1 and 2 to execute one cycle of reciprocating motion for each revolution of the power shaft. The swivel joint 13 allows rotation of the walking beam 11 about the pin 15 and the two pins 9 and 10 allow the two arms 1 and 2 to rotate during the rectilinear motion of the assembly, so that the teeth 3 and 4 on the two arms can engage and disengage the teeth 6 of wheel 5. When the ratchet is driving the shaft 7 the teeth on the arms are held firmly against the teeth on the wheel by spring 12. The sleeve bearing 16 restricts rod 14 and 11, 1, 2 to a rectilinear motion without subjecting bellows 17 to a shearing stress. The ratchet assembly is hermetically sealed by the bellows 17 which has one end attached to end plate 18 and the other end attached to the housing 21. The lower, end surfaces 23 and 24 of the two arms 1 and 2 respectively, are cut or tapered so that they can pass freely over the mating surfaces of block 22 which is fastened to the housing 21. When the two arms are pushed below some predetermined distance by lowering cam 36, the two arms will be separated and disengage the the teeth 3 and 4 on the arms from the teeth 6 on the wheel 5, so that the wheel 5 can be turned without the teeth 3 and 4 engaging teeth 6 and consequently the shaft 7 may be freely rotated in either direction. With teeth cut as shown in Figure 1, the shaft 7 will rotate in a clockwise direction and the direction of rotation will be independent of the direction of rotation of the power shaft.

When shaft 7 must be rotated in a counter clockwise direction the ratchet assembly 1', 2' ... shown in Figure 2 can replace the assembly 1, 2 ... shown in Figure 1. The two assemblies 1, 2 ... and 1', 2' ... are the same except teeth 3, 4, 6 are cut to produce a clockwise rotation of the output shaft 7 with a rotation of power shaft 20 and teeth 2', 3', 6' are cut to produce a counter clockwise rotation of shaft 7 with a rotation of 20 when the cam lock 36' is in the raised position. When the cam lock is turned down as shown at 36', the ratchet assembly is forced down and the two arms 1', 2' are forced apart by surfaces 23' and 24' acting on block 22'. This disengages the teeth 1', 2' from 6' and allows shaft 7 to rotate without interference from assembly 1', 2' ...

When the output shaft 7 must be rotated part of the time in a clockwise direction and part of the time in a counter clockwise direction, the two assemblies shown in Figures 1 and 2 can be mounted together so that the power shaft 20 will actuate both cams 19 and 19' and both assemblies 1, 2 ... and 1', 2' ..., can be used to actuate the output shaft 7 as shown in Figure 3. The two bearings for 20 are 29 and 30 and they are supported by housing 21. Lateral movement of 20 is prevented by the two rings 31 and 32. The two main bearings 25 and 26 for shaft 7 are attached to housing 21 and the lateral movement of the shaft is prevented by rings 27 and 28. The rider 33 is moved along shaft 7 by engaging thread 34 and when the travel of rider 33 is relatively long, an extra bearing 35 is provided to control and support the end 7. Either cam lock 36 or 36' can be turned up as shown at 36 or turned down as shown at 36'. Since the two assemblies 1, 2 ..., and 1', 2' ... will rotate shaft 7 in opposite directions when power shaft 20 is rotated, it is necessary to turn cam lock 36' down so that the ratchet assembly 1', 2' ... is forced down and the two arms 1', 2' are forced apart by surfaces 23' and 24' acting on block 22'. This disengages the teeth 1', 2' from 6' and allows shaft 7 to be rotated without interference from assembly 1', 2' ... If now shaft 20 is rotated, cam 19 will control the motion of the ratchet assembly 1, 2 ... and rotate the shaft 7 clockwise. By turning cam 36 down and cam 36' up, the teeth on arms 1 and 2 are disengaged from the teeth on wheel 6 and the teeth on arms 1', 2' will engage the teeth on wheel 6', so that a rotation of shaft 20 will cause cam 19 to set the ratchet assembly 1', 2' ... in motion and consequently rotate shaft 7 in a counter clockwise direction.

In Figure 4 the two covers 38 and 38' are secured to the chamber 21 to form the two fluid tight compartments 37 and 37'. The two bellows 17, 17' are capped by the end plates 18, 18' respectively, and the construction of the mechanical assemblies inclosed in housing 21 is the same in Figure 4 as they are in Figure 3.

The force acting on the bellows is $(P_x - P_s)A = \Delta P$. $A$. where $P_x$ is the applied pressure, $P_s$ the pressure in the system, $(P_x - P_s)$ the pressure differential $\Delta P$, and $A$ the piston area of the bellows. When $(P_x - P_s) = 0$, the bellows will be in its rest position. When the pressure differential is increased to $(P_x - P_s)_r = \Delta P_r$, the bellows will be compressed enough to cause the ratchet arms to rotate the ratchet wheel through an angle corresponding to the length of arc occupied by one or more teeth on the wheel. When the pressure $P_x$ is decreased until it is less than the pressure $P_s$, the bellows will expand, and if the negative pressure differential $-(P_x - P_s)_r = -\Delta P_r$ is made great enough, the ratchet wheel will be turned in the same direction as it was turned when the pressure differential was great enough to operate the ratchet by compressing the bellows. By forcing $P_x$ to pass through a cyclic change in pressure, so that $(P_x - P_s)_r$ continues to oscillate between $+\Delta P_r$ and $-\Delta P_r$, the bellows assembly is forced to execute a reciprocating motion which causes the shaft 7 to rotate. When two assemblies 1, 2 ... and 1', 2' ... are used and it is necessary to disengage the teeth of assembly 1', 2' ... so that the assembly 1, 2 ... can rotate the shaft 7 in a clockwise direction without interference from assembly 1', 2' ..., the pressure $P_x$ in compartment 37' is increased to $P+_d$, which is high enough to separate the teeth 3', 4' on the two arms 1', 2' from the teeth 6' on the wheel 5'. When shaft 7 is to be rotated in a counter-clockwise direction the pressure $P_x$ in compartment 37 is increased to $P+_d$ which disengages the teeth 3, 4 on the two arms 1, 2 from the teeth 6 on wheel 5 and the pulsating pressure $\pm\Delta P_r$ from the pump 40 is applied to chamber 37' which actuates the ratchet assembly 1', 2' ... and causes shaft 7 to rotate in a counter-clockwise rotation.

The pump for supplying a pulsating pressure consists of a piston 39, cylinder 40, crank shaft 41, bearings 42, connecting rod 43, wrist pin 44, bearing 45, bellows 46, fluids 47, 48, outlet 49, which is connected to the outlet of chamber 38, outlet 49' which is connected to 38', and valves 50, 50'. With valve 50 closed and 50' open, the crank shaft 41 is turned over until piston 39 has compressed fluid 47, which elongates the bellows 46, and compresses fluid to a sufficient pressure to disengage a ratchet assembly similar to that shown in Figure 3, after which valve 50' is closed, and valve 50 is opened.

The motor 51 through crankshaft 41, and rod 43, forces the piston 39 to execute a reciprocating motion. On the forward stroke fluid 47 is compressed which in turn elongates bellows 46 and compresses the fluid 48 until the pressure $P_x$ in chamber 38 is increased to $P_s + \Delta P$. This will compress bellows 17 and force the ratchet through one stroke of a two stroke cycle. On the return stroke of piston 39 the bellows is compressed and the pressure of fluid 48 is reduced to $P_s - \Delta P$ and this is the second stroke of the two stroke cycle. As the motor continues to stroke the piston the pressure will oscillate between $\pm\Delta P$ with each revolution of the crank shaft.

When the direction of rotation of the ratchet assembly is to be reversed, the valve 50' is closed, valve 50 opened and the pressure increased until the ratchet assembly attached to the rod 14 is disengaged, after which valve 50 is closed, valve 50' opened and the piston set into a reciprocating motion by motor 50 and a pulsating pressure is applied to chamber 38'.

For simplification of the drawings only two ratchet assemblies have been shown, although it is possible to use a plurality of ratchet assemblies similar to the assembly 1, 2, 3 . . . to turn the shaft in a clockwise direction, and a plurality of ratchet assemblies similar to assembly 1′, 2′, 3′ . . . to turn the shaft in a counter-clockwise direction.

It has been assumed in describing the action of the bellows assembly that the spring action of the bellows and the internal pressure of the system will produce a force great enough to maintain contact between plate 18 and the cam 19. A greater force can be exerted on the plate by adding a spring to the assembly so that the combined force acting on the plate will be equal to the force exerted by the spring action of the bellows, plus the force exerted by the spring, plus the force $(P_x-P_s).A$ exerted by the liquid in the system.

What I claim is:

1. Apparatus for transmitting mechanical energy into a sealed pressurized chamber comprising, a rotatable drive shaft, a cam secured to said shaft, a flexible fluid seal member consisting of a bellows and an end plate sealing the cam end of the bellows, said bellows and plate being disposed beneath the cam, the other end of the bellows being hermetically sealed to the outer wall of the chamber, a guided member within the bellows secured at one end to the plate and communicating with the interior of the chamber toothed arm members secured to the free end of the guided member, a toothed wheel within the chamber engageable by said arms, a driven shaft supporting said toothed wheel, said wheel and driven shaft being rotated by the reciprocating motion of the arms upon rotation of the drive shaft, and means including the pressure within the chamber independent of the drive shaft and cam to elongate the bellows after each downward movement thereof to provide a continuous drive for the driven shaft.

2. Apparatus according to claim 1 in which the rotatable drive shaft is provided with a second cam having a greater throw than the first cam and a tapered block underlying the toothed arm members whereby the bellows may be compressed and the toothed arms moved out of contact with the wheel.

3. Apparatus for transmitting mechanical energy into a pressurized sealed chamber comprising, a source of pulsing fluid pressure, a small compartment in communication with the pressure source secured to the outer wall of the sealed chamber, a flexible fluid seal member consisting of a bellows and an end plate sealing one end of said bellows, said bellows and plate being disposed within the small compartment and hermetically sealed at its other end to the outer wall of the chamber, a guided member within the bellows secured at one end to the plate and communicating with the interior of the chamber, toothed arm members secured to the free end of the guided member, a toothed wheel within the chamber engageable by said arms and a driven shaft supporting said toothed wheel, and means including said source of pressure and the pressure within the chamber to elongate the bellows after each downward movement to provide a continuous drive for the driven shaft.

4. Apparatus for transmitting mechanical energy into a sealed chamber comprising, a source of pulsing fluid pressure, a plurality of small compartments in communication with the pressure source secured to the outer wall of the sealed chamber, a flexible fluid seal member consisting of a bellows and an end plate sealing one end of said bellows, said bellows and plate being disposed within each of the small compartments and hermetically sealed at its other end to the outer wall of the chamber, a guided member within the bellows secured at one end to the plate and communicating with the interior of the chamber, toothed arm members secured to the free end of each of the guided members, a toothed wheel within the chamber engageable by said arms and a driven shaft supporting said toothed wheels, and means including said source of pressure to elongate the bellows after each downward movement to provide a continuous drive for the driven shaft.

References Cited in the file of this patent

UNITED STATES PATENTS

| 205,120 | Moreau et al. | June 18, 1878 |
| 217,026 | Stuart | July 1, 1879 |
| 390,976 | Kincaid | Oct. 9, 1888 |
| 880,545 | Leavitt | Mar. 3, 1908 |
| 2,335,269 | Eves et al. | Nov. 30, 1943 |
| 2,491,361 | Burdick | Dec. 13, 1949 |
| 2,557,345 | Franki | June 19, 1951 |

FOREIGN PATENTS

| 8 | Great Britain | Jan. 1, 1887 |
| 236,952 | Germany | July 14, 1911 |
| 461,558 | France | Oct. 31, 1915 |